(No Model.)  
4 Sheets—Sheet 2.

F. F. RAYMOND, 2d.
HEEL NAILING MACHINE.

No. 321,756. Patented July 7, 1885.

WITNESSES.
INVENTOR.

(No Model.) 4 Sheets—Sheet 3.
F. F. RAYMOND, 2d.
HEEL NAILING MACHINE.
No. 321,756. Patented July 7, 1885.
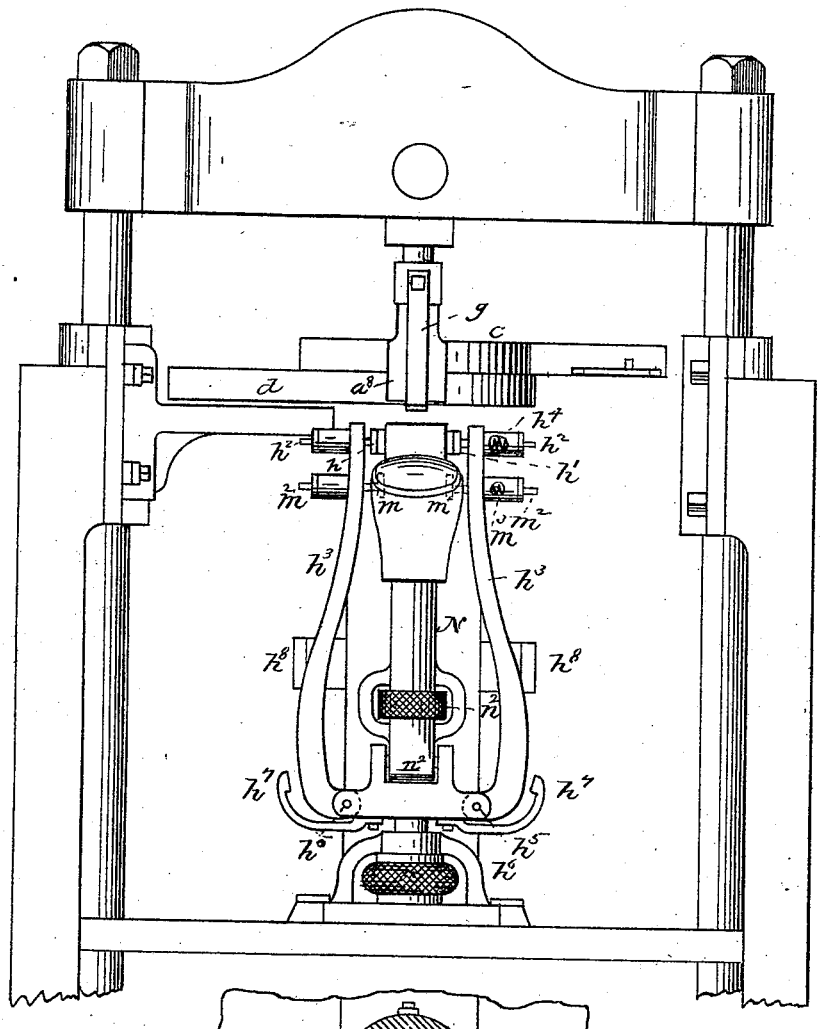
Fig. 4.
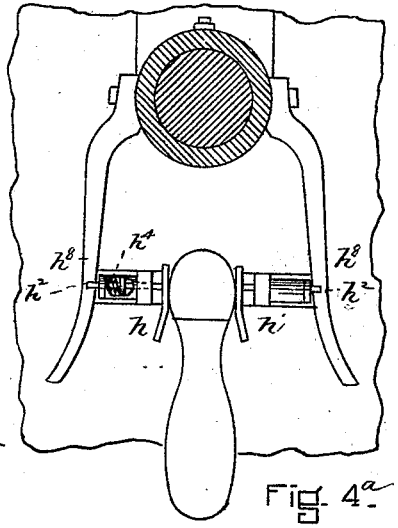
Fig. 4$^a$.
WITNESSES.
Bowdoin S. Parker
J. M. Dolan
INVENTOR.
F. F. Raymond

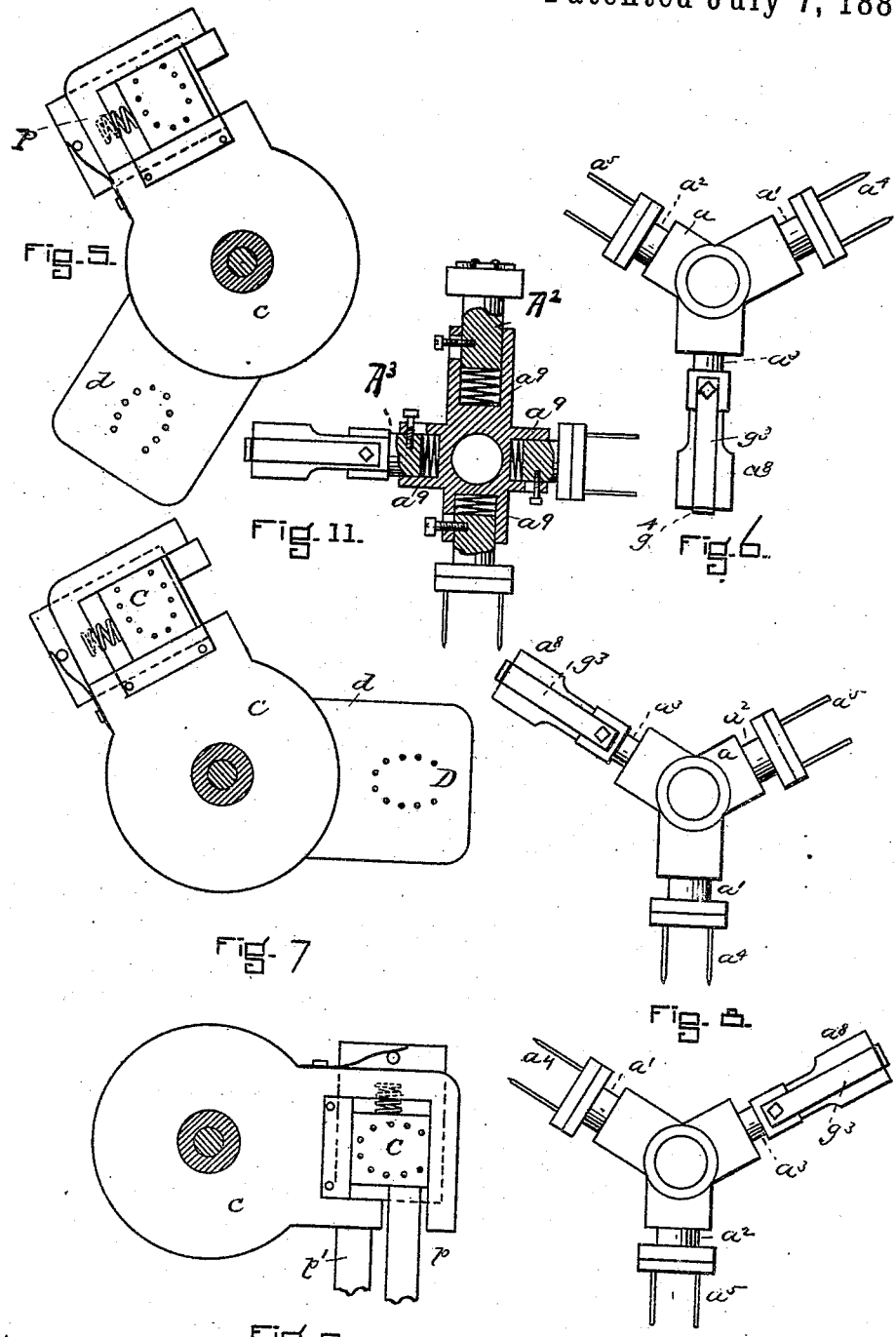

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 321,756, dated July 7, 1885.

Application filed April 25, 1884. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature, in which—

Figure 1:
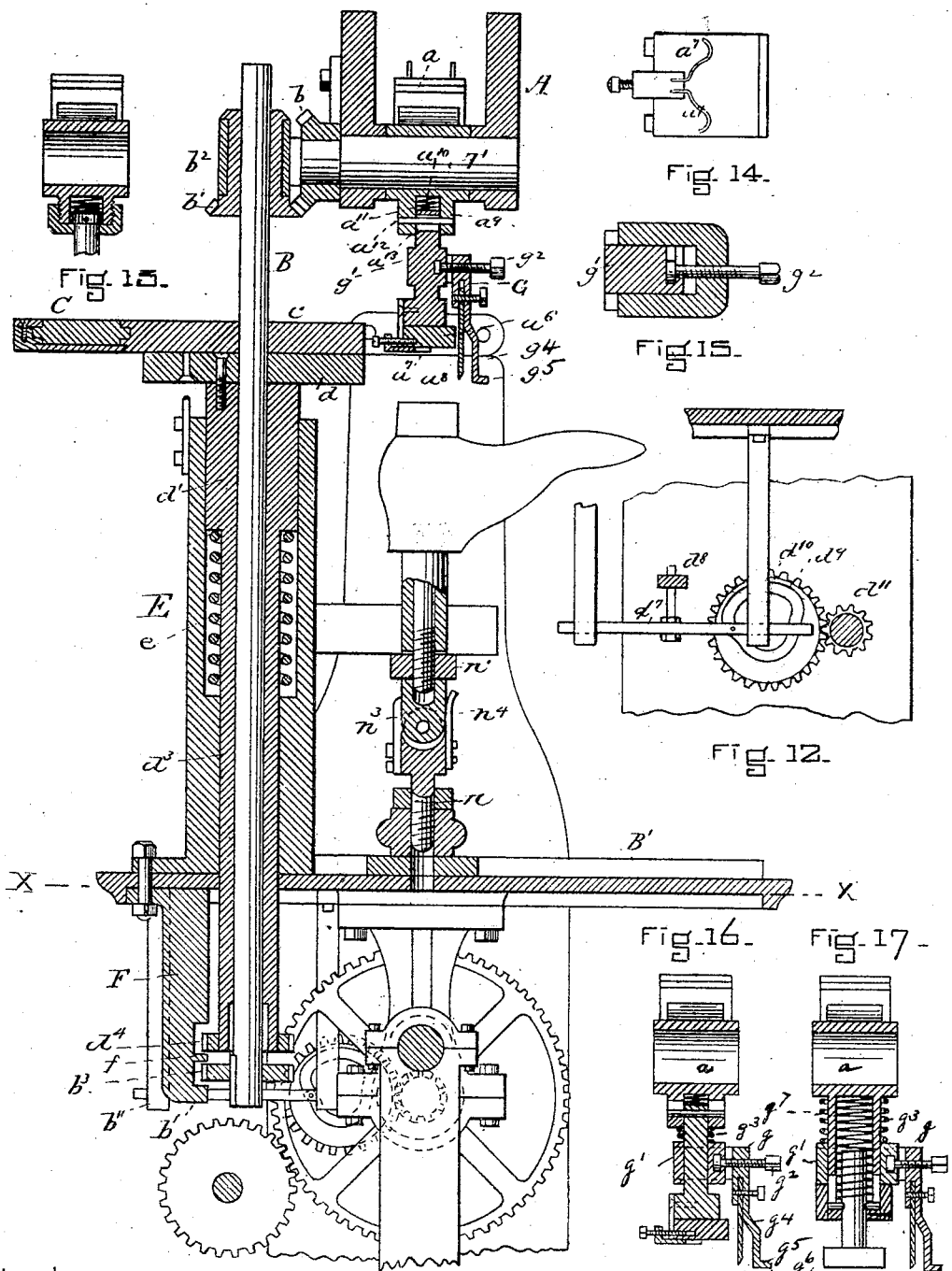
Figure 2:
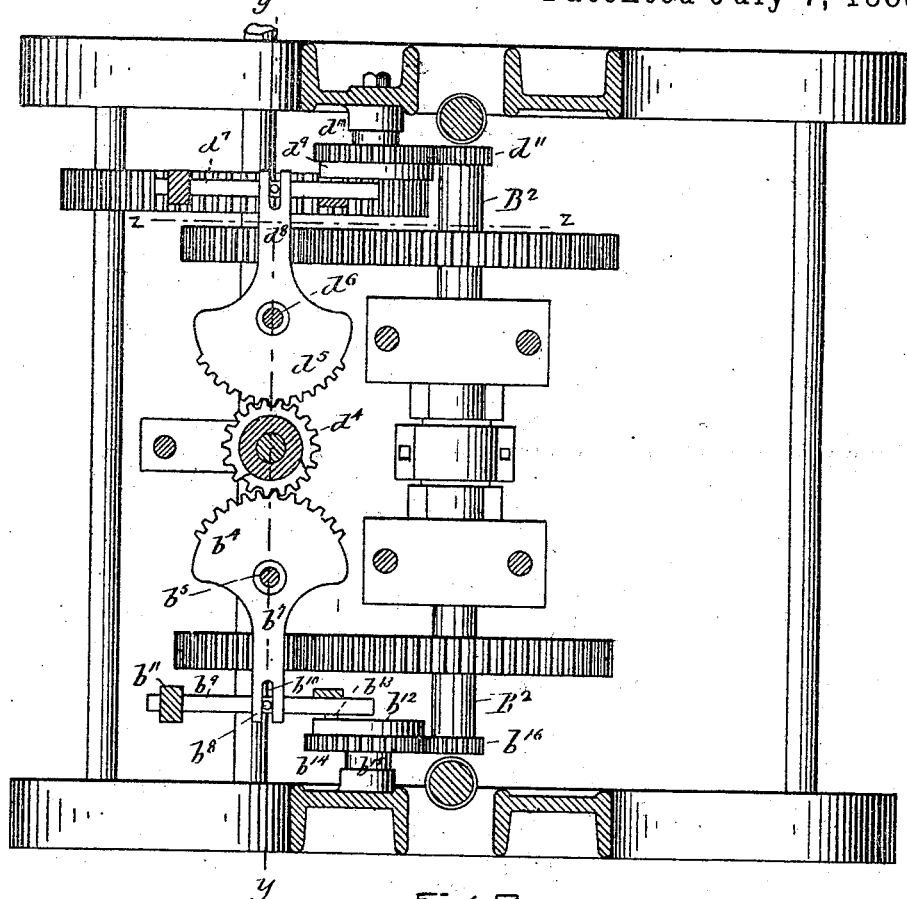
Figure 3:
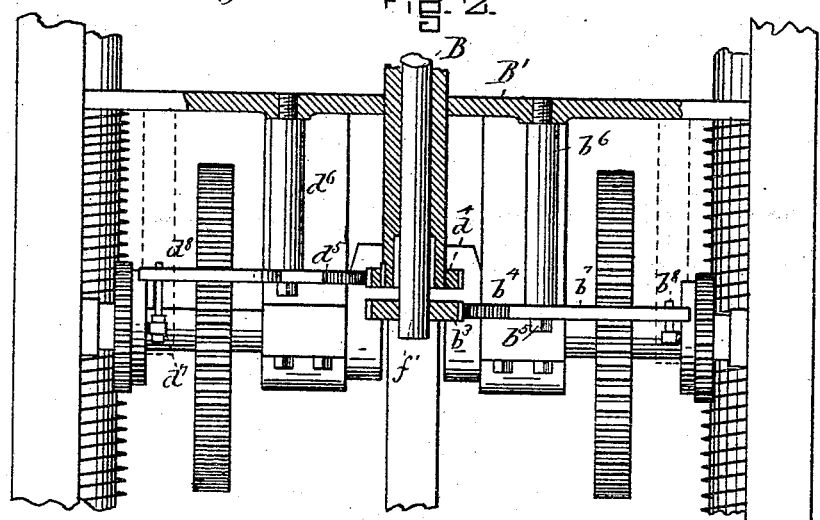

Figure 1 is a view, part in vertical section and part in elevation, of a portion of a National heel-nailing machine containing the features of my invention. Fig. 2 is a horizontal section and plan on and below the line $x\ x$ of Fig. 1. Fig. 3 is a vertical section and elevation upon the line $y\ y$ of Fig. 2. Fig. 4 is a front elevation. Fig. $4^a$ is a plan view of the heel-blank centering devices. Figs. 5 to 10, inclusive, are detail views, hereinafter referred to. Fig. 11 represents in vertical section and elevation a revolving head having four arms—one for supporting the awls, one for supporting the drivers, one the top-lift holder and spanker, and one a heel-breasting knife. Fig. 12 is a view in elevation back of the line $z\ z$ of Fig. 2. Fig. 13 represents a manner of attaching the arms of the revolving head thereto, as hereinafter specified. Fig. 14 represents in inverted plan the top-lift holder. Fig. 15 is a view in horizontal section of the spanker and top-lift supporting-arm and heel-breasting carriage carried thereby. Figs. 16 and 17 represent in detail the methods of attaching and using the heel-breasting knife, which are hereinafter fully described.

The invention relates especially to the nail-holder and templet-plates and to the movements which are provided them, and to the means for providing the plates with said movements; to a new form of jack, and to the use, in connection with the heel-nailing devices, of mechanism for breasting the heel.

It also relates to various details of construction, which are hereinafter referred to.

In the drawings, A is the cross-head. It is similar to that described in the Henderson patents, Nos. 252,215 and 259,687, and is reciprocated by the mechanism therein described or in any other suitable way. It supports the revolving head $a$, which has the awl-supporting arm $a'$, the driver-supporting arm $a^2$, an arm, $a^3$, for supporting a spanker, top-lift holder, or both, and heel-breasting knife. While these three devices—namely, the top-lift holder, spanker, and heel-breasting knife—may be supported by one arm, it is desirable, when a breasting-knife is used, that a revolving head of four arms, as represented in Fig. 11, be employed, in which case the spanker, with or without the top-lift holder, will be supported by the arm $A^2$ and the heel-breasting knife by the arm $A^3$. Of course the revolving head may have a combination of any two of these devices desired.

In the drawings, $a^4$ represents the awls; $a^5$, the drivers; $a^6$, the spanker; $a^7$, the top-lift holder; $a^8$, the heel-breasting knife.

As heel-blanks vary considerably as to their density, some requiring a great deal more pressure than others to compress within a certain space, and as it is oftentimes impossible to provide for a given amount of pressure, but no more, so that the machine cannot be injured by excessive pressure, I have represented the arms carrying the awls, drivers, and spanker as arranged to have a limited extent of movement in relation to the revolving head and in opposition to strong spiral springs. It is intended, however, that this movement shall only take place when the pressure upon the heel exceeds a certain degree, and I therefore use strong springs which cannot be compressed unless this excess of pressure occurs. To provide for this feature of the invention I form the revolving head $a$ with the projections $a^9$, having the holes $a^{10}$, which hold the springs $a^{11}$, and the ends of the awl-holder, driver-holder, and spanker-arms. These arms are secured in place so as to have a movement in said hole by means of a pin, $a^{12}$, which extends through the arms into slots $a^{13}$ in the extension, or by means of a nut arranged to screw upon the end of the projection and shut on the shoulder of the arm, as represented in Fig. 13. The head $a$ may be revolved or moved on the cross-head A automatically or by hand, and it may be moved automatically by the mechanism herein referred to, comprising a bevel-gear, $b$, on the end of the shaft $A'$, a bevel-gear, $b'$, on the shaft B, carried by the bracket $b^2$, fastened or secured to the head A. The gear-wheel $b^3$ is mounted on the lower end of said shaft, and the sector $b^4$ is pivoted at $b^5$ to a post or support, $b^6$, preferably extending downward from the bed-plate B' of the machine. The sector has the arm $b^7$, which is engaged by the pivoted block $b^8$ on the reciprocating slide-bar $b^9$. The arm $b^7$ has a recess or slot, $b^{10}$, for the reception of the pivoted block $b^8$ to permit the adjustment of the arm to the block as it moves in the arc of a circle. The slide-bar $b^9$ is supported by suitable ways or guides, $b^{11}$, which may extend from the bed-plate of the machine, or any other portion thereof, and is reciprocated by means of a cam-groove in the cam-disk $b^{12}$, a cam-pin, $b^{13}$, fastened to the bar $b^9$, entering the groove. The cam is fastened directly to a spur-wheel, $b^{14}$, or to a shaft actuated thereby, and is supported by the bracket or post $b^{15}$, and a spur-wheel, $b^{16}$, upon the crank-shaft $B^2$ transmits the power to the cam. This construction for operating the revolving head, however, cannot be used when it is intended to entirely revolve the head, and consequently cannot well be employed when the revolving head has more than two arms. When it has three or four arms, the form of construction described in a pending application, Serial No. 127,755, for revolving the head should be used. This shaft B is also used for moving the nail-holder plate $c$, which carries the nail-holder C, the nail-holder plate being secured to the shaft by a spline or in any other suitable way. And I wish to say in this connection that the shaft B may be used for operating the nail-holder plate only, if desired; and it operates to move or reciprocate the plate from an inoperative to an operative position upon an arc of a circle, but does not revolve the plate, so that its position when inoperative is shown in plan in Figs. 5 and 7, and when in operative position in Fig. 9.

The templet-plate $d$ is perforated to form the templet D, and supports the nail-holder plate $c$, and has tubular extension or support $d'$, preferably made separate from the templet-plate, (the templet-plate being bolted or otherwise fastened thereto.) This extension or support is inclosed by the upper end of the hollow post E, which forms a bearing for it. Connected with this portion $d'$ or formed therewith is the tubular shaft $d^2$, which surrounds the shaft B and extends downward through the hole in the post E below the bed-plate B', and carries at its lower end a gear-wheel, $d^4$, which is operated by the sector $d^5$, pivoted at $d^6$, reciprocating bar $d^7$, which engages the sector-arm $d^8$ and oscillates the sector $d^5$, and is operated by the cam-groove in the cam-disk $d^9$, the gear-wheel $d^{10}$, and spur-wheel $d^{11}$ on the shaft $B^2$; and as this portion of the mechanism is like that more fully described for operating shaft B, it need not be more specially stated here. It will be seen by this mechanism the templet-plate is automatically oscillated on an arc of a circle into and out of operative position. In other words, both the templet and nail-holder plates are oscillated into and out of position, the extent of the movement of each plate being varied according to the shape of the cam, the leverage of the sector it operates and its size, and the size of the gear-wheel which meshes with it. The templet and nail-holder plates have a downward vertical movement against the stress of the spring $e$ or any other equivalent force. As these plates have a vertical movement, it is of course necessary either that the shafts B and $d^2$ be vertically movable therewith, or that the plates move vertically on the shafts. I have shown them vertically movable with the plates, and have therefore splined the gear-wheels $b^3$ $d^4$ thereon, and support them by means of the bracket F, having the extension $f$, which supports the gear-wheel $d^4$, and the extension $f'$, which supports the gear-wheel $b^3$, the two shafts having vertical movements in relation to the said gear-wheel; and as the cross-head A moves a greater distance than the nail-holder and templet plates the gear $b'$ is splined upon the shaft B, so that it may have a vertical movement thereon.

The breasting-knife $a^8$ is supported by a carriage, $g$, which is horizontally adjustable on the block $g'$ by means of the adjusting-screw $g^2$. This block $g'$ is movable upon its supporting-arm against the stress of a spring, $g^3$, (see Figs. 16 and 17,) and there is attached to the carriage $g$, carrying the knife, a downward extension or arm, $g^4$, carrying the foot $g^5$, which extends to the same level or just below the level of the lower edge of the breasting-knife.

In operation, upon the downward movement of the knife, the knife breasts the heel, and is held in place by the spring $g^3$ until the presser-foot $g^5$ comes in contact with the sole of the boot or shoe, when, if there is a further downward movement of the cross-head, the knife becomes stationary and the spring yields to permit the said further movement.

I would say that it is not necessary to use with the heel-breasting knife the top-lift spanker and the top-lift attaching devices.

The presser-block $g^6$ has a vertical movement with its supporting-arm, and is moved downward by the spring $g^7$ to exert considerable pressure upon the heel, but which yields upon the contact of the presser-block upon the upper surface of the heel, so that after the presser-block has become stationary the cross-head A may continue its downward movement and cause the breasting-knife to operate.

The shoe-centering and heel-centering devices are carried by the jack, and the heel-blank centering devices comprise the guides $h$ $h'$, which preferably are shaped as shown in Fig. 4$^a$, and are supported upon the end of the rods or arms $h^2$, each of which preferably extends backward, one through the upper end of one of the arms $h^3$ and the other through the upper end of the other arm $h^3$. These guides are pushed inward through the arms $h^3$ by the springs $h^4$, so that upon contact of the guides with the sides of the heel-blank a yielding movement of the arms $h^3$ in relation thereto prevails, and they are held to their work by a yielding pressure. The arms $h^3$ also support the shoe-centering guides $m\ m'$. These guides are preferably of the same shape as the heel-blank guides. They are adapted to bear against the edge of the sole of the boot or shoe, and are carried by the rods $m^2$ and held or pushed inward from the arm $h^3$ by springs $m^3$. The arms $h^3$ are pivoted to have a lateral movement in relation to the heel-support at $h^5$ (see Fig. 4) to the lower section, $h^6$, of the jack, and when the jack is drawn out they rest upon the stops $h^7$, so that the heel-blank and shoe-guides are separated sufficiently to permit the work to be placed upon the heel-support. Upon the inward movement of the jack these arms come in contact with the guide-plates $h^8$, which are attached to the post E and project horizontally, and are of the shape in plan shown in Fig. 4ᵃ—that is, their ends are bent outwardly to form guiding-surfaces, against which the outer edges of the arms $h^8$ come in contact as the jack is being pushed in place, and which automatically close the arms $h^3$ toward each other, so that the shoe-centering devices are brought in contact with the sole of the shoe, and if the heel-blank has been placed the heel-guides are brought in contact with it, and if it has not been placed they are brought into position to receive and center it. These arms $h^3$, together with the jack-post N, are vertically adjustable together by means of the screw $n$, and the jack-post N is also independently vertically adjustable by means of the screw $n'$. The jack-post preferably is pivoted at $n^2$ to swing outward and downward, and when so arranged its backward movement may be limited by means of the stop $n^3$, and it may be held against the same by means of the spring $n^4$. When the jack-post is thus pivoted, it will not be necessary to move the jack-carriage every time a boot or shoe is jacked, but only to provide for the horizontal adjustment of the shoe and heel-blank guides.

The machine may be stopped after each reciprocation of the cross-head, or it may make two or more reciprocations before being stopped; but as I have claimed in previous patents these features I need not further refer to them here.

In Figs. 5, 7, and 9 I have shown a construction to prevent the sudden stopping of the nail-holder plate when brought into position over the templet from the transmitting jar or concussion to the nail-holder, and this construction may be employed when the nail-holder is brought in contact with a stop at the end of its movement, and this result is accomplished by making the nail-holder movable in the nail-holder plate against the stress of a powerful spring, so that when it is brought in contact with the stop by the movement of the nail-holder plate it is held against the stop by the spring, while the plate, upon being suddenly arrested by its stop, may vibrate in relation thereto.

In the drawings, the nail-holder C is arranged to slide in ways cut or formed in the nail-holder plate against the stress of the spring P, and when moved to feed the nails it is brought in contact with the stop $p$, which extends from the side of the frame of the machine, while the nail-holder plate comes in contact with another stop, $p'$. The stop $p$ accurately locates the nail-holder in relation to the templet, and the spring-pressure behind the nail-holder prevents it from vibrating, so that the holes immediately register with the holes in the templet; and this will occur even if the nail-holder plate shall continue to vibrate after it comes in contact with its stop $p'$. Any suitable sliding plate may be used for covering and uncovering the holes in the nail-holder when it is brought into position over the templet.

In operation the boot or shoe is placed upon the heel-support, the jack moved into position, and the heel end of the boot or shoe centered upon the jack by the centering-guides $m\ m'$. The heel-blank is placed upon the heel end of the inverted boot or shoe, and is centered by the heel-blank guides $h\ h'$. The templet-plate is in position over the heel-blank, as represented in Fig. 7. A reciprocation of the machine drives the awls through the templet into the heel-blank, moves the templet down upon the heel-blank, and automatically locks it, and upon the upper portion of the stroke the nail-holder plate is moved partly or wholly into position. It can be so moved, if desired, or it can be moved in part, and the movement completed upon the upper part of the downward movement of the cross-head upon its second reciprocation. The nails are thus fed to the heel-blank and are driven from the templet-plate therein, and upon the upward stroke of the cross-head the nail-holder and templet-plates are moved automatically to one side to the position shown in Fig. 5, when the spanker and heel-breasting knife, if used, are reciprocated.

As Fig. 4ᵃ is not intended to illustrate the construction of the post E, it is shown in section as solid.

Having thus fully described my invention, I claim and desire to secure by Letters Patent of the United States—

1. The heel-nailing machine provided with a rotating head having carrying-arms upon which are mounted, respectively, heel-piercing, nail-driving, top-lift spanking, and heel-breasting devices, in combination with a support for the boot or shoe.

2. The heel-nailing machine provided with a rotating head having carrying-arms upon which are mounted, respectively, heel-piercing, nail-driving, top-lift spanking, and heel-breasting devices, in combination with a cross-head for reciprocating the same, and a support for the boot or shoe.

3. In a heel-nailing machine, the combination of the nail-holder plate $c$, its nail-holder C, and mechanism, substantially as described, for automatically oscillating it upon an arc of a circle into and out of operative position.

4. In a heel-nailing machine, the combination of the templet-plate $d$, the templet D, the shaft B, and means, substantially as specified, for oscillating the templet automatically upon an arc of a circle into and out of operative position, substantially as specified.

5. In a heel-nailing machine, the combination of the templet-plate $d$, the templet D, the nail-holder plate $c$, the nail-holder C, and means, substantially as specified, for operating the same automatically upon an arc of a circle into and out of operative position, substantially as described.

6. The combination of the templet D, nail-holder C, and mechanism, substantially as described, for moving them automatically upon an arc of a circle into and out of operative position, and suitable heel-attaching devices, substantially as described.

7. A heel-nailing machine provided with a templet, D, and a nail-holder C, and mechanism, substantially as described, for moving them automatically upon an arc of a circle into and out of operative position, and suitable heel attaching and breasting devices.

8. In a heel-nailing machine, the combination of a reciprocating head having arms shaped, as described, for supporting blocks carrying, respectively, a gang of awls, a gang of drivers, and a heel-spanker, or either of them, with the springs or spring resting in sockets in the rear of the shanks of said blocks, all substantially as and for the purposes described.

9. In a heel-nailing machine, the combination of the cross-head A, the heel-breasting block $g'$, spring $g^3$, knife $a^5$, and presser-foot $g^5$, all substantially as and for the purposes described.

10. The combination, in a heel-nailing machine, of the cross-head A, block $g'$, carriage $g$ horizontally adjustable thereon, the spring $g^3$, knife $a^5$, and the presser-foot $g^5$, all substantially as and for the purposes described.

11. In a heel-nailing machine, the combination of the nail-holder plate $c$, shaft B, gear $b^3$, sector $b^4$ $b^7$, the cam $b^{12}$, and connecting mechanism, substantially as specified.

12. In a heel-nailing machine, the combination of the head $a$, the nail-carrier plate $c$, the shaft B, the sector $b^4$, pivoted as described, its arm $b^7$, the sliding bar $b^9$, operated by a cam, all substantially as and for the purposes set forth.

13. The combination of the templet-plate $d$, its shaft $d^2$, gear-wheel $d^4$, sector $d^5$ $d^8$, connecting-rod $d^7$, and cam $d^9$ for operating the same, all substantially as and for the purposes described.

14. The combination of the templet-plate $d$, its support $d'$ and $d^3$, the post E, extended about said support $d$, and suitable operating mechanism, all substantially as and for the purposes described.

15. The combination of the post E, the tubular shaft $d^2$ for operating the templet-plate, and the shaft B within the tubular shaft for operating the nail-holder plate, and suitable operating mechanism, all substantially as and for the purposes described.

16. The combination of the reciprocating cross-head A, the head $a$ carried thereby, the shaft B, and means for moving it a portion of a revolution forward and back, consisting of the sector $b^4$, cam $b^{12}$, and intermediate connecting mechanism, all substantially as and for the purposes described.

17. In a heel-nailing machine, the combination of the arms $h^3$, supporting the yielding heel-blank guides $h$ $h'$ and shoe-guides $m$ $m'$, or either, and means for moving them laterally toward each other, all substantially as and for the purposes described.

18. The combination of the nail-holder plate $c$, and the movable nail-holder C and spring P, all substantially as and for the purposes described.

19. In a heel-nailing machine, the combination of a jack-post, hinged as described, the stop $n^3$, and spring $n^4$, all substantially as and for the purposes described.

20. The combination, in a heel-nailing machine, of the templet, and mechanism, substantially as described, for moving it vertically, with the hinged or pivoted jack adapted to be moved beneath and from the templet, all substantially as described.

21. The combination, in a heel-nailing machine, of the templet, and means, substantially as described, for moving it horizontally, with the hinged or pivoted jack adapted to be moved beneath and away from the templet, all substantially as described.

22. The combination, in a heel-nailing machine, of the templet, suitable heel-nailing devices, and a hinged jack provided with guides $h$ $h'$ $m$ $m'$ carried thereby, all substantially as described.

F. F. RAYMOND, 2d.

Witnesses:
FRED. B. DOLAN,
E. A. PHALEN.